3,298,777
THERMOELECTRIC COMPOSITIONS OF
$Nb_xTa_{1-x}Si_yGe_{2-y}$
Lothar H. Brixner, West Chester, Pa., assignor to E. I. du Pont de Nemours and Company, Wilmington, Del., a corporation of Delaware
No Drawing. Filed Dec. 12, 1961, Ser. No. 158,865
4 Claims. (Cl. 23—315)

This invention relates to new thermoelectric materials. Particulrly, it relates to new thermoelectric materials comprising at least three of the elements niobium, tantalum, silicon, and germanium.

It is an object of this invention to produce compounds which exhibit valuable thermoelectric properties, and which are solid solution derivatives of the binary silicides and germanides of niobium and tantalum. These compounds have the general formula AB, where A represents the group $Nb_xTa_{1-x}$ and B represents $Si_yGe_{2-y}$, with $x$ having a value 0 to 1, inclusive, and $y$ having a value 0 to 2, inclusive, with the further provision that the value of at least one of $x$ and $y$ must differ within their specified ranges from the stated minimum and maximum limits by a value of at least 0.25.

It is also an object of this invention to produce thermoelectric materials which are useful in devices where a Seebeck voltage (thermocurrent) is required.

It is a further object of this invention to produce thermoelectric materials which exhibit an exceptionally high Seebeck coefficient at elevated temperatures, making these thermoelectric alloys especially valuable for applications at such elevated temperatures.

It is a further object of this invention to produce thermoelectric materials which are exceptionally resistant to oxidation at elevated temperatures and which exhibit low thermal conductivity.

The products of this invention can be prepared by reacting under an inert atmosphere and at temperatures of about 1000–2200° C. a powdered mixture of the constituent elements in the ratios specified by the general formula given above.

Heating can be accomplished in a number of ways. For example, the powders in proportionate amounts for the product desired can be sealed in quartz ampoules and fired at a temperature in the range of 1000° C. to 1200° C. for a period of from about 10 to about 20 hours. The duration of the firing period will vary depending on the reactants used, the size of the charge, and the equipment used. It may be stated as a general rule that firing of the powdered mixture is continued until X-ray diffraction patterns fail to disclose the characteristic lines of the starting components. It is preferred to use commercially available reactants of the highest purity available and to have them in a —200 mesh (Standard Screen Scale) particle size before firing.

Although the novel compositions of this invention may be prepared by the above-described powder metallurgical technique, may preferred method for preparing these has been to effect direct combination of the elements by heating the reactant elements to above their reacting temperature by means of arc-melting in an inert atmosphere.

In preparing the thermoelectric alloys by arc-melting, the proportionate amounts of powdered elements for the composition desired are mixed and the mixture is reacted under an electric arc in an argon atmosphere. In order to obtain the products in a more convenient form for testing their electric properties, the buttons resulting from the arc melting are ground, the powder cold pressed into a bar-shaped specimen, usually ¼" x ¼" x 2" in size, and the resulting compact sintered by inductive heating at a temperature slightly below the melting point of the alloy. The temperature required for this sintering step will be in the range of 1500–1800° C. Those compositions which are high in silicon will require a sintering temperature in the upper part of this temperature range, while those high in germanium may be sintered by heating in the lower part of the range. The time required for the sintering step is not particularly critical, but should not be less than about ½ hour and need not be in excess of about 8 hours.

The products of this invention are conductors of electricity, possess thermal stability to at least 1000° C., exhibit low thermal conductivity, and a large Seebeck effect, especially in the temperature range of 800–1200° C. Seebeck coefficient is calculated from measured voltage at a known temperature differential by the formula $$S = \frac{E.M.F.}{\Delta T} \times 1000$$

Also, all of the compositions of this invention have a figure of merit at room temperature of at least $0.5 \times 10^{-4}$. Preferred compositions of this invention have a figure of merit of at least $1.0 \times 10^{-3}$ at 1000° C. The figure of merit for thermoelectric materials takes into account the fact that low resistivity and low thermal conductivity as well as high Seebeck coefficient are necessary for a good thermoelectric material. The equation for calculating the figure of merit is as follows:

$$Z\text{(figure of merit in °C.}^{-1}\text{)} = \frac{S^2}{rk}$$

where $r$ is resistivity in ohm-cm., $k$ is the thermal conductivity in watts per centimeter degree, and S is the Seebeck coefficient in volts per degree centigrade.

For a clearer understanding of the invention, the following specific examples are given. The examples are intended to be merely illustrative of the invention and not in limitation thereof. All parts given are by weight.

EXAMPLE I

This example describes the preparation of $NbGe_{1.5}Si_{0.5}$

Portions of the three elements niobium, silicon, and germanium, in a powder form were weighed and thoroughly mixed, 8.000 g. of niobium, 1.208 g. silicon, and 9.377 g. germanium being used. The powder mixture was arc-melted into a button under an argon atmosphere. The button was crushed in an agate mortar and the resulting powder was cold-pressed into a bar ¼″ x ¼″ x 2″ at 50 t.s.i. The bar which was obtained was of about 65% of theoretical density, and did not have great green strength. It was sintered by inductively heating the bar, contained in a water-cooled copper boat, at a temperature just slightly below the melting point. A strong compact of about 98% theoretical density was obtained.

The sintered bar was analyzed by X-ray diffraction procedures. It was found to crystallize in the C40 type structure with parameters $a_0$=4.910 A. and $c_0$=6.730 A. No lines of the starting components were observed. These crystallographic data, together with data for other compositions of this invention, are reported in Table 1 below.

Electrical properties were determined and these are reported, together with the results of tests on other compositions of this invention, in Table 1.

The resistivity of the bar was measured by the two-point method and was found to be 1.21 milliohm-cm. Electrical energy was developed by butting the bar between two copper blocks (machined from the same piece of stock) maintained at different temperatures. Temperatures were measured at approximately the cross-sectional center of the bar immediately behind the contact faces. With a temperature differential ($\Delta T$) of 203° C., ($T_1$, 224° C., $T_2$, 21° C.)

an E.M.F. of 2.84 millivolts was obtained. The Seebeck coefficient, $$\frac{E.M.F. \times 1000}{\Delta T}$$

was calculated from these data. This value, and other electrical properties including figure of merit, the definition of which is given above, are given in Table 2 below.

EXAMPLE II

In the same manner as described in Example I, a sintered bar of the compound NbSiGe was prepared by melting together 8.000 g. niobium, 2.416 g. silicon, and 6.251 g. germanium. Crystallographic data are recorded in Table 1 below, and electrical properties are given in Table 2.

EXAMPLES III THROUGH IX

Using the same procedure as described above, sintered bars of the compositions given below were prepared by melting together the indicated amounts of the constituent elements. Crystallographic and electrical data are recorded in Tables 1 and 2 below.

|  | Compound Prepared | Constituent Elements |
| --- | --- | --- |
| Example III | $NbSi_{1.5}Ge_{0.5}$ | 10.000 g. Nb, 4.530 g. Si, 3.907 g. Ge. |
| Example IV | $TaGe_{1.5}Si_{0.5}$ | 13.288 g. Ta, 8.000 g. Ge, 1.031 g. Si. |
| Example V | $TaGeSi$ | 9.966 g. Ta, 4.000 g. Ge, 1.546 g. Si. |
| Example VI | $TaGe_{0.5}Si_{1.5}$ | 9.966 g. Ta, 2.000 g. Ge, 2.319 g. Si. |
| Example VII | $Nb_{0.75}Ta_{0.25}Si_2$ | 5.000 g. Nb, 3.245 g. Ta, 4.027 g. Si. |
| Example VIII | $Nb_{0.5}Ta_{0.5}Si_2$ | 3.000 g. Nb, 5.841 g. Ta, 3.624 g. Si. |
| Example IX | $Nb_{0.25}Ta_{0.75}Si_2$ | 1.800 g. Nb, 10.513 g. Ta, 4.349 g. Si. |

Table 1
CRYSTALLOGRAPHIC PARAMETERS OF COMPOUNDS OF EXAMPLES I THROUGH IX

| Example | Composition | $a_0$ (A.) | $c_0$ (A.) |
| --- | --- | --- | --- |
| I | $NbGe_{1.5}Si_{0.5}$ | 4.910 | 6.730 |
| II | $NbGeSi$ | 4.885 | 6.682 |
| III | $NbGe_{0.5}Si_{1.5}$ | 4.834 | 6.635 |
| IV | $TaGe_{1.5}Si_{0.5}$ | 4.910 | 6.706 |
| V | $TaGeSi$ | 4.859 | 6.658 |
| VI | $TaGe_{0.5}Si_{1.5}$ | 4.840 | 6.635 |
| VII | $Nb_{0.75}Ta_{0.25}Si_2$ | 4.778 | 6.566 |
| VIII | $Nb_{0.5}Ta_{0.5}Si_2$ | 4.770 | 6.553 |
| IX | $Nb_{0.25}Ta_{0.75}Si_2$ | 4.766 | 6.550 |

All compositions were of the C40 type crystal structure. In no case were lines of the starting components observed in the crystallographic analyses.

These data show that each compound is a solid solution, and that each is a single phase material. In no case were lines derived from the reactants observed in the X-ray diffraction patterns of the products.

Table 2
ELECTRICAL PROPERTIES OF COMPOUNDS OF EXAMPLES I THROUGH IX

| Example | Composition | Electrical Resistivity, m$\Omega$-cm. at 25° C. | Seebeck Coefficient, $\mu$v./deg. C. | Thermal Conductivity, watts/deg. cm. | Figure of Merit (Z) C°$^{-1}$ (based on 25° C. measurements) |
| --- | --- | --- | --- | --- | --- |
| I | $NbGe_{1.5}Si_{0.5}$ | 0.11 | 14 ($T_1$=224, $T_2$=21) | 0.020 | 0.89·10$^{-4}$ |
| II | $NbGeSi$ | 0.08 | 11 ($T_1$=206, $T_2$=25) | 0.017 | 0.89·10$^{-4}$ |
| III | $NbGe_{0.5}Si_{1.5}$ | 0.06 | 10 ($T_1$=213, $T_2$=24) | 0.028 | 0.59·10$^{-4}$ |
| IV | $TaGe_{1.5}Si_{0.5}$ | 0.14 | 13 ($T_1$=208, $T_2$=28) | (¹) | (²) |
| V | $TaGeSi$ | 0.09 | 14 ($T_1$=202, $T_2$=25) | 0.013 | 1.67·10$^{-4}$ |
| VI | $TaGe_{0.5}Si_{1.5}$ | 0.08 | 18 ($T_1$=206, $T_2$=26) | (¹) | (²) |
| VII | $Nb_{0.75}Ta_{0.25}Si_2$ | 0.14 | 19 ($T_1$=154, $T_2$=32) | (¹) | (²) |
| VIII | $Nb_{0.5}Ta_{0.5}Si_2$ | 0.09 | 17 ($T_1$=182, $T_2$=29) | 0.035 | 0.92·10$^{-4}$ |
| IX | $Nb_{0.25}Ta_{0.75}Si_2$ | 0.13 | 13 ($T_1$=179, $T_2$=30) | (¹) | (²) |

¹ Not measured.  ² Not calculated.

The electrical properties of the compounds of Examples II and IX were investigated as a function of temperature. Outstanding electrical properties were found for these compositions in the temperature range of 800° C. to 1000° C. These high-temperature electrical properties are given in Table 3. The outstanding figure of merit of about $1.1 \times 10^{-3}$ which is shown for the compound of Example II should be compared with such well-established high-temperature thermoelectric materials as MnTe which has a figure of merit of about $0.4 \times 10^{-3}$ at 900° C. and InAs which has a figure of merit of about $0.7 \times 10^{-3}$ at 700° C. Also, it was noted that when the compounds of Examples II and IX were heated to 1000° C. in air they remained essentially unreacted during the testing time of 16 hours. This resistance to oxidation at high temperature is an important characteristic of my novel compounds.

*Table III*

ELECTRICAL PROPERTIES OF THERMOELECTRIC ALLOYS AT ELEVATED TEMPERATURES

| Composition | Resistivity (mΩ-cm.) | Thermal Conductivity (watts/deg. cm.) | Seebeck Coefficient ($\mu$v./° C.) | Figure of Merit (Z, C°⁻¹) |
|---|---|---|---|---|
| Ex. II.—NbSiGe at— | | | | |
| 200 | 0.10 | 0.02 | 12 | $0.07 \cdot 10^{-3}$ |
| 400 | 0.12 | 0.019 | 18 | $0.15 \cdot 10^{-3}$ |
| 600 | 0.14 | 0.018 | 30 | $0.32 \cdot 10^{-3}$ |
| 800 | 0.16 | 0.017 | 44 | $0.65 \cdot 10^{-3}$ |
| 1,000 | 0.18 | 0.017 | 61 | $1.1 \cdot 10^{-3}$ |
| Ex. IX.—Nb$_{0.25}$Ta$_{0.75}$Si$_2$ at— | | | | |
| 200 | 0.19 | 0.033 | 19 | $0.5 \cdot 10^{-4}$ |
| 400 | 0.28 | 0.027 | 27 | $0.8 \cdot 10^{-4}$ |
| 600 | 0.34 | 0.024 | 36 | $1.5 \cdot 10^{-4}$ |
| 800 | 0.38 | 0.022 | 48 | $2.7 \cdot 10^{-4}$ |
| 1,000 | 0.37 | 0.022 | 66 | $0.55 \cdot 10^{-3}$ |

The examples given above are representative of compositions which may be made according to this invention. However, many other variations are possible. For example, one might prepare a composition approximately midway between those of VII and VIII which would have the composition Nb$_{0.65}$Ta$_{0.35}$Si$_2$. In a similar manner, compositions intermediate between those of other examples can also be prepared.

The compositions of this invention are useful in generating electric current directly from thermal energy without reliance upon mechanical parts. They are particularly useful for generating of electric current at elevated temperatures up to 1000° C. or even higher. Thermoelectric generators are well known in the art, and thermoelectric elements of a size and shape to fit any particular generator can be prepared from the compositions of this invention by compacting these compositions into the desired shape and size before sintering.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Thermoelectric compositions having figure of merit of not less than $0.5 \times 10^{-4}$° C.⁻¹ and having the general formula Nb$_x$Ta$_{1-x}$Si$_y$Ge$_{2-y}$, where $x$ is a value of 0 to 1 inclusive, and $y$ is a value of 0 to 2 inclusive, with the further provision that the value of at least one of $x$ and $y$ must differ within their specified ranges from the minimum and maximum limits by a value of at least 0.25.

2. A thermoelectric composition having a figure of merit about $0.9 \times 10^{-4}$° C.⁻¹ and having the formula NbSiGe.

3. A thermoelectric composition having a figure of merit of about $1.7 \times 10^{-4}$° C.⁻¹ and having the formula TaSiGe.

4. A thermoelectric composition having a figure of merit about $0.9 \times 10^{-4}$° C.⁻¹ and having the formula Nb$_{0.5}$Ta$_{0.5}$Si$_2$.

References Cited by the Examiner

UNITED STATES PATENTS

| | | | |
|---|---|---|---|
| 2,955,145 | 10/1960 | Schrewelius | 136—5 |
| 2,985,700 | 5/1961 | Johnston | 136—5 |
| 3,009,977 | 11/1961 | Houston | 136—5 |
| 3,033,907 | 5/1962 | Rue | 136—5 |

WINSTON A. DOUGLAS, *Primary Examiner.*

JOHN H. MACK, *Examiner.*

J. BARNEY, A. M. BEKELMAN, *Assistant Examiners.*